United States Patent
Lee et al.

(10) Patent No.: US 11,628,370 B2
(45) Date of Patent: Apr. 18, 2023

(54) COMBAT GAME PROVIDING DEVICE AND METHOD

(71) Applicant: GAMFS. INC, Seongnam-si (KR)

(72) Inventors: Jun Hee Lee, Suwon-si (KR); Jin Ho Lee, Bucheon-si (KR)

(73) Assignee: NEOWIZ, Seongnam-Si (KR)

( * ) Notice: Subject to any disclaimer, the term of this patent is extended or adjusted under 35 U.S.C. 154(b) by 762 days.

(21) Appl. No.: 16/329,247

(22) PCT Filed: Aug. 22, 2017

(86) PCT No.: PCT/KR2017/009131
§ 371 (c)(1),
(2) Date: Feb. 28, 2019

(87) PCT Pub. No.: WO2018/043978
PCT Pub. Date: Mar. 8, 2018

(65) Prior Publication Data
US 2019/0247758 A1  Aug. 15, 2019

(30) Foreign Application Priority Data
Sep. 2, 2016 (KR) .......................... 10-2016-0113309

(51) Int. Cl.
*A63F 13/847* (2014.01)
*A63F 13/79* (2014.01)
(Continued)

(52) U.S. Cl.
CPC ............ *A63F 13/847* (2014.09); *A63F 13/35* (2014.09); *A63F 13/45* (2014.09); *A63F 13/79* (2014.09); *A63F 13/795* (2014.09); *A63F 13/822* (2014.09)

(58) Field of Classification Search
CPC .......... A63F 13/87; A63F 13/35; A63F 13/79; A63F 13/795; A63F 13/822; A63F 13/45; A62F 13/45
See application file for complete search history.

(56) References Cited

U.S. PATENT DOCUMENTS 9,539,512 B1 * 1/2017 Kim .................. A63F 13/56
2014/0155156 A1 * 6/2014 Peck ................. A63F 13/332
463/31

FOREIGN PATENT DOCUMENTS

CN  101158897 A  4/2008
CN  103593546 A  2/2014
(Continued)

OTHER PUBLICATIONS

Gamechosun, "[Final Review] 'Real Strategy'! The endless charm from a small trouble! Dragonhearts!", May 19, 2016, Search address <http://www.gamechosun.co.kr/webzine/article/view.php?no=134087>.

(Continued)

*Primary Examiner* — William H McCulloch, Jr.
*Assistant Examiner* — Ankit B Doshi
(74) *Attorney, Agent, or Firm* — Harness, Dickey & Pierce, P.L.C.

(57) ABSTRACT

The present invention relates to a combat game providing device comprising: a receiving unit for receiving input information from a player; a player vs environment (PvE) game providing unit, which primarily requests a PvE player to arrange one or more player characters (PCs) among a plurality of PCs possessing preset actions in a plurality of preset cells when input information corresponding to a PvE game is received, and secondarily requests the order, in which actions possessed by the arranged PCs are executed, to be set, thereby providing, to the PvE player, a PvE game for fighting with one or more non-player characters (NPCs)

(Continued)

among a plurality of preset NPCs; and a player vs player (PvP) game providing unit, which requests a PvP player to arrange PCs one by one, among the plurality of PCs in the plurality of cells, according to the order determined by preset rules, and provides, to the PvP player, a PvP game for fighting by executing actions possessed by the arranged PCs according to the arranged order thereof.

14 Claims, 7 Drawing Sheets

(51) Int. Cl.
  *A63F 13/822* (2014.01)
  *A63F 13/795* (2014.01)
  *A63F 13/45* (2014.01)
  *A63F 13/35* (2014.01)

(56) References Cited

FOREIGN PATENT DOCUMENTS

| CN | 104415536 A | 3/2015 |
|---|---|---|
| CN | 104667529 A | 6/2015 |
| JP | 2002065937 A | 3/2002 |
| JP | 2002301270 A | 10/2002 |
| JP | 2011206441 A | 10/2011 |
| JP | 2013202331 A | 10/2013 |
| JP | 5809402 B2 | 11/2015 |
| JP | 2016005544 A | 1/2016 |
| JP | 2016041319 A | 3/2016 |
| JP | 2016150169 A | 8/2016 |
| KR | 10-2015-0012327 A | 2/2015 |
| KR | 10-1612355 B1 | 4/2016 |

OTHER PUBLICATIONS

Ruliweb, "[Review][Multi] Wonder tactics : Deployment is tactics", Feb. 28, 2016, Search address <http://bbs.ruliweb.com/hobby/board/11/read/1461?page=6>.
<https://114632.blog.me./220708221440>.
<https://cafe.naver.eom/chainchronicle/114058>.
International Search Report (in English and Korean) and Written Opinion (in Korean) issued in PCT/KR2017/009131, dated Dec. 5, 2017; ISA/KR.
Office Action issued in corresponding Chinese Patent Application No. 201780067528.2 dated Mar. 1, 2022.
"How to play Plants vs Zombies? Plants vs Zombies game rules," dated Jan. 20, 2015; http://www.973.com/z2859.

* cited by examiner

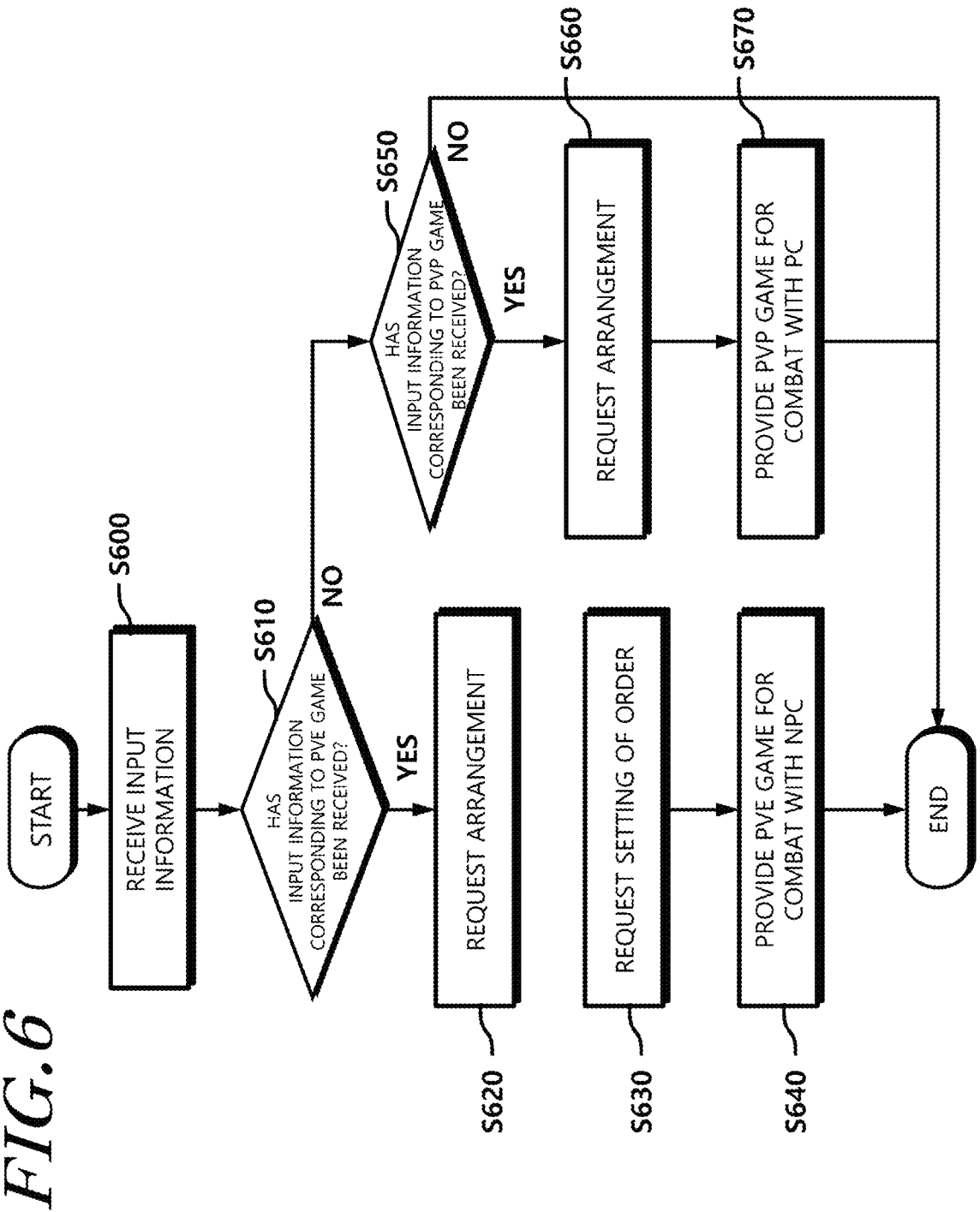

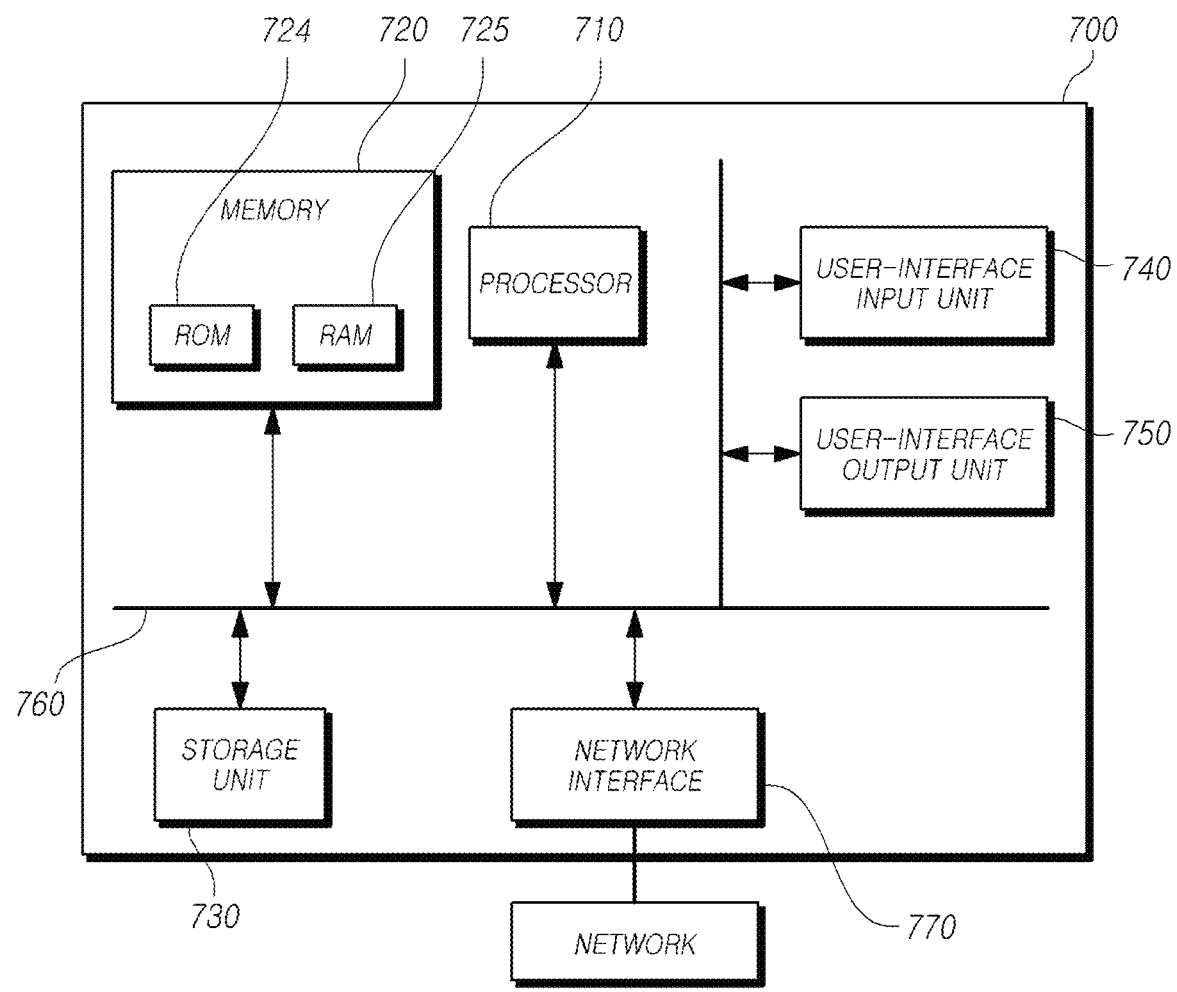

COMBAT GAME PROVIDING DEVICE AND METHOD

CROSS-REFERENCE TO RELATED APPLICATIONS

This application is a U.S. National Phase Application under 35 U.S.C. 371 of International Application No. PCT/KR2017/009131, filed on Aug. 22, 2017, which claims the benefit of Korean Patent Application No. 10-2016-0113309, filed on Sep. 2, 2016, in Korea. The disclosures of the above applications are incorporated herein by reference. Furthermore, this patent application claims priorities in countries other than the U.S. for the same reason based on the Korean Patent Application, the entire contents of which are hereby incorporated by reference.

TECHNICAL FIELD

The present invention relates to a combat game providing technique and more particular to a combat game providing device and a combat game providing method that provides a game having various game methods depending on players.

BACKGROUND ART

An online game refers to a game which can be enjoyed by connecting a computer and an external system via a network and is often called a multiple user dialogue or multiple user dungeon (MUD) or a multiple user graphic (MUG) game.

Online games have been activated with development of the Internet. A predetermined program provides an online game which can be enjoyed with other users by installing the program in a hard disk drive of a computer and accessing a server.

Various games have been developed with development of network and graphics techniques. Various combat games which can be simultaneously enjoyed online by a plurality of users have been commercialized in these days in which the high-speed Internet has been generalized.

However, since the conventional combat games merely raise only player characters and cause the player characters to combat, there is a problem that users will lose an interest in the games.

SUMMARY OF INVENTION

Technical Problem

An objective of an aspect of the invention is to provide a combat game providing device and a combat game providing method that can keep an interest in a game by providing various variables for combats.

Solution to Problem

According to an aspect of the invention, there is provided a combat game providing device including: a receiving unit configured to receive input information from a player; and a game providing unit that includes at least one of a player vs Environment (hereinafter abbreviated to PvE) game providing unit configured to firstly request a PvE player to arrange one or more player characters (hereinafter abbreviated to PCs) out of a plurality of PCs possessing predetermined actions in a plurality of cells, to secondly request the PvE player to set an order in which actions possessed by the arranged PCs are executed, and to provide a PvE game for combat with one or more non-player characters (hereinafter abbreviated to NPCs) to the PvE player when input information corresponding to the PvE game is received and a player vs player (hereinafter abbreviated to PvP) game providing unit configured to request a PvP player to arrange one PC out of the plurality of PCs in each of the plurality of cells in accordance with an order which is determined by a predetermined rule and to provide a PvP game for combat by executing actions possessed by the arranged PCs in accordance with the order in which the PCs are arranged to the PvP player when input information corresponding to the PvP game is received.

According to another aspect of the invention, there is provided a combat game providing method including: a receiving step of receiving input information from a player; and a game providing step of providing at least one game of a player vs Environment (hereinafter abbreviated to PvE) game and a player vs player (hereinafter abbreviated to PvP) game, wherein the game providing step includes a step of firstly requesting a PvE player to arrange one or more player characters (hereinafter abbreviated to PCs) out of a plurality of PCs possessing predetermined actions in a plurality of cells, secondly requesting the PvE player to set an order in which actions possessed by the arranged PCs are executed, and providing a PvE game for combat with one or more non-player characters (hereinafter abbreviated to NPCs) to the PvE player when input information corresponding to the PvE game is received and a step of requesting a PvP player to arrange one PC out of the plurality of PCs in each of the plurality of cells in accordance with an order which is determined by a predetermined rule and providing a PvP game for combat by executing actions possessed by the arranged PCs in accordance with the order in which the PCs are arranged to the PvP player when input information corresponding to the PvP game is received.

Advantageous Effects of Invention

As described above, according to the aspects of the invention, it is possible to provide a combat game that can keep an interest in a game by providing various variables for combats.

BRIEF DESCRIPTION OF DRAWINGS

FIG. 6 is a diagram illustrating an example for describing operations of the combat game providing method according to the embodiment.

FIG. 7 is a block diagram illustrating a configuration of a combat game providing device according to another embodiment.

MODE FOR CARRYING OUT INVENTION

Figure 1:
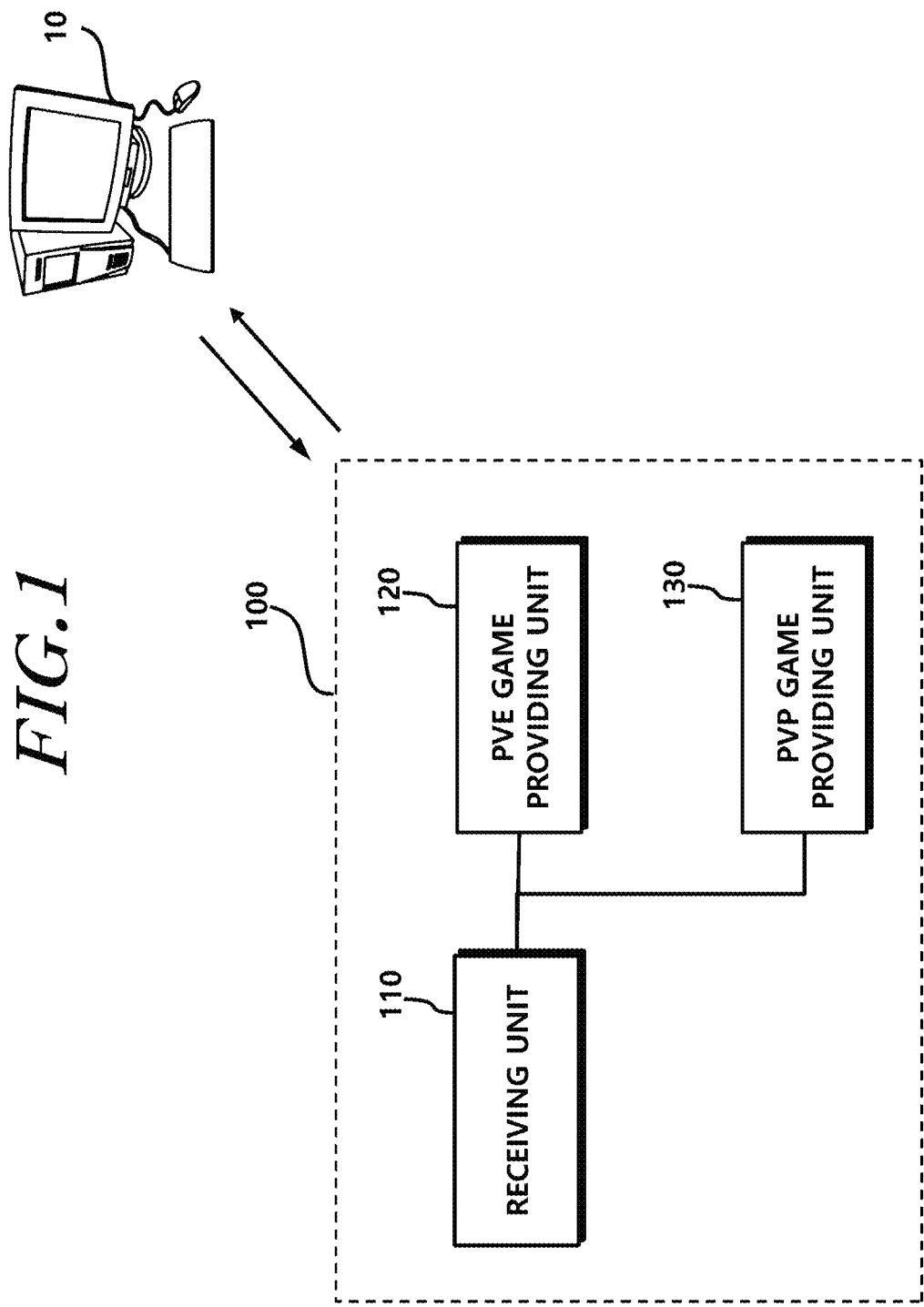
FIG. 1 is a diagram illustrating a configuration of a combat game providing device according to an embodiment.

An aspect of the invention provides a combat game providing device including a receiving unit that receives input information from a player and a game providing unit that firstly requests a player vs Environment (hereinafter abbreviated to PvE) player to arrange one or more player characters (hereinafter abbreviated to PCs) out of a plurality of PCs possessing predetermined actions in a plurality of cells, secondly requests the PvE player to set an order in which actions possessed by the arranged PCs are executed, and provides a PvE game for combat with one or more non-player characters (hereinafter abbreviated to NPCs) to the PvE player when input information corresponding to the PvE game is received and that requests a player vs player (hereinafter abbreviated to PvP) player to arrange one PC out of the plurality of PCs in each of the plurality of cells in accordance with an order which is determined by a predetermined rule and provides a PvP game for combat by executing actions possessed by the arranged PCs in accordance with the order in which the PCs are arranged to the PvP player when input information corresponding to the PvP game is received.

Another aspect of the invention provides a combat game providing method including a receiving step of receiving input information from a player; and a game providing step of firstly requesting a player vs Environment (hereinafter abbreviated to PvE) player to arrange one or more player characters (hereinafter abbreviated to PCs) out of a plurality of PCs possessing predetermined actions in a plurality of cells, secondly requesting the PvE player to set an order in which actions possessed by the arranged PCs are executed, and providing a PvE game for combat with one or more non-player characters (hereinafter abbreviated to NPCs) to the PvE player when input information corresponding to the PvE game is received and requesting a player vs player (hereinafter abbreviated to PvP) player to arrange one PC out of the plurality of PCs in each of the plurality of cells in accordance with an order which is determined by a predetermined rule and providing a PvP game for combat by executing actions possessed by the arranged PCs in accordance with the order in which the PCs are arranged to the PvP player when input information corresponding to the PvP game is received.

Embodiments of Invention

Hereinafter, some embodiments will be described in detail with reference to the accompanying drawings. In denoting elements of the drawings by reference numerals, the same elements will be referenced by the same reference numerals although the elements are illustrated in different drawings. In the following description of the invention, detailed description of known functions and configurations incorporated herein will be omitted when it may make the subject matter of the invention rather unclear.

Terms such as first, second, A, B, (a), or (b) may be used herein to describe elements of the invention. Each of the terms is not used to define essence, order, sequence, or number of an element, but is used merely to distinguish the corresponding element from another element. When it is mentioned that an element is "connected" or "coupled" to another element, it should be interpreted that another element may be "interposed" between the elements or the elements may be "connected" or "coupled" to each other via another element as well as that one element is directly connected or coupled to another element.

In the following description, a player vs Environment (hereinafter abbreviated to PvE) player refers to a player that has transmitted input information corresponding to a PvE game and a player vs player (hereinafter abbreviated to PvP) player refers to a player that has transmitted input information corresponding to a PvP game. That is, a user who has not transmitted input information corresponding to a PvE game or a PvP game is referred to as a player, a user who has transmitted input information corresponding to a PvE game is referred to as a PvE player, and a user who has transmitted input information corresponding to a PvP game is referred to as a PvP player. The same user may be referred to as a player, a PvE player, or a PvP player in the drawings in which action is not likely to be illustrated, which should be understood with reference to the description. A game in this specification should be understood to be a concept including at least one of a PvE game and a PvP game.

FIG. 1 is a diagram illustrating configuration of a combat game providing device according to an embodiment.

Referring to FIG. 1, a combat game providing device 100 includes a receiving unit that receives input information from a player 10, a PvE game providing unit 120 that firstly requests a PvE player 10 to arrange one or more player characters (hereinafter abbreviated to PCs) out of a plurality of PCs possessing predetermined actions in a plurality of cells, secondly requests the PvE player to set an order in which actions possessed by the arranged PCs are executed, and provides a PvE game for combat with one or more non-player characters (hereinafter abbreviated to NPCc) to the PvE player 10 when input information corresponding to the PvE game is received, and a PvP game providing unit 130 that requests a PvP player 10 to arrange one PC out of the plurality of PCs in each of the plurality of cells in accordance with an order which is determined by a predetermined rule and provides a PvP game for combat by executing actions possessed by the arranged PCs in accordance with the order in which the PCs are arranged to the PvP player 10 when input information corresponding to the PvP game is received. Here, the predetermined rule may be at least one of input information which is received from a PvP player 10 in real time and input information which has been received in advance.

In FIG. 1, the PvE game providing unit 120 and the PvP game providing unit 130 are illustrated as separate elements, but this is only an example. The combat game providing device 100 illustrated in FIG. 1 can be embodied as a game providing unit (not illustrated) including at least one of the PvE game providing unit 120 and the PvP game providing unit 130.

A player 10 can carry a device such as a portable terminal as a device that can provide input information to the combat game providing device 100 according to the embodiment and receive a game provided from the combat game providing device 100.

The receiving unit 110 of the combat game providing device 100 according to the embodiment can receive input information which is provided from a player 10. The input information can include information which is generated to select a PvE game for combat with an NPC in response to a certain action (which may be, for example, actions of clicking, dragging, or flicking a mouse) of a user corresponding to an input device, information which is generated to select a PvP game for combat with a PC, information which is generated to arrange PCs possessing predetermined actions in a plurality of cells, and information which is generated to set an order for executing actions possessed by PCs.

When input information corresponding to a PvE game is received, the PvE game providing unit 120 of the combat game providing device 100 according to the embodiment can firstly request a PvE player 10 to arrange one or more player characters out of a plurality of PCs possessing predetermined actions in a plurality of cells, secondly request the PvE player to set an order in which actions possessed by the arranged PCs are executed, and provides a PvE game for combat with one or more non-player characters to the PvE player 10.

This will be described below in more detail with reference to FIG. 2 which is a diagram illustrating an example for describing the operation of the PvE game providing unit of the combat game providing device according to the embodiment.

Figure 2:
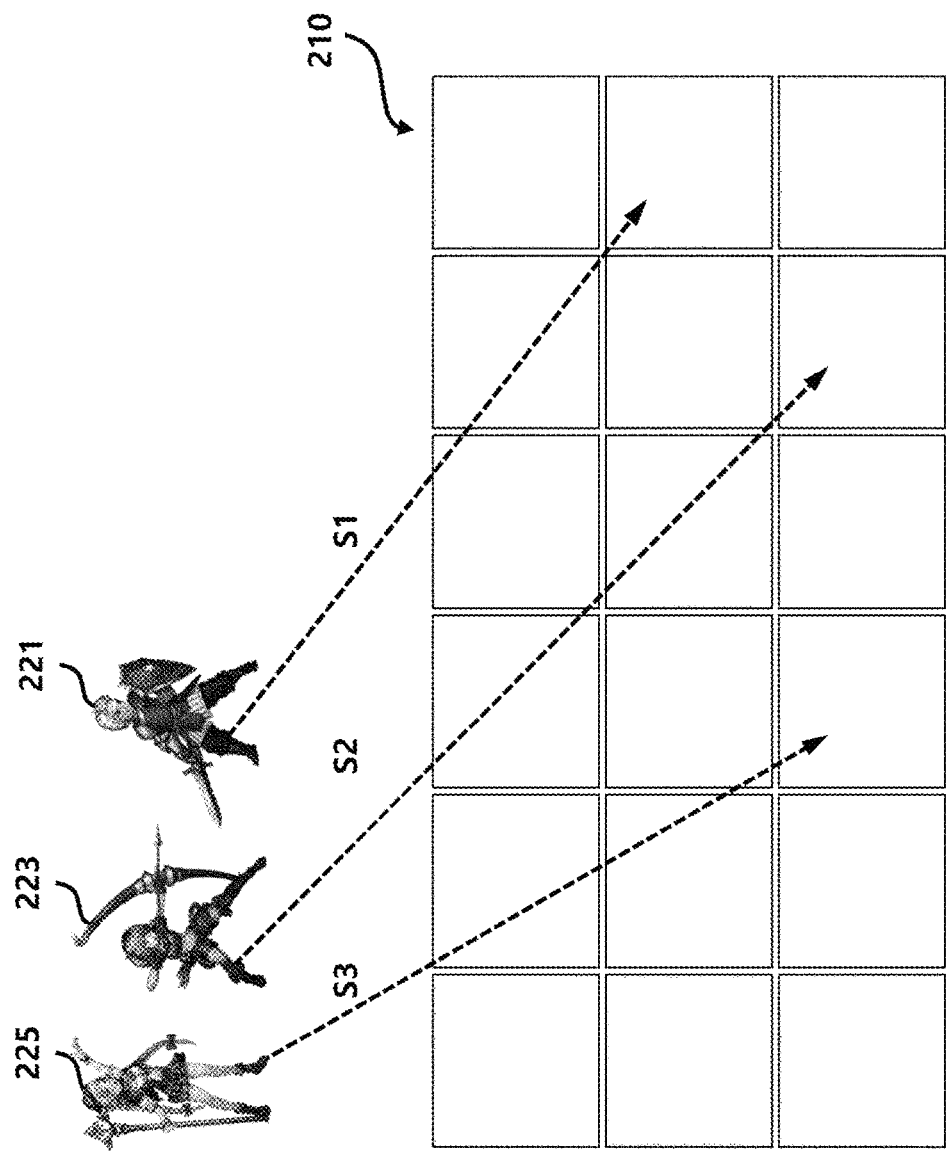
FIG. 2 is a diagram illustrating an example for describing an operation of a PvE game providing unit of the combat game providing device according to the embodiment.

Referring to FIG. 2, the PvE game providing unit 120 can firstly request a PvE player 10 to arrange one or more PCs 221, 223, and 225 out of a plurality of PCs 221, 223, and 225 possessing predetermined actions in a plurality of cells 210 (S1, S2, and S3). In FIG. 2, three PCs are illustrated as the plurality of PCs, and more PCs may be provided.

In response to this request, the PvE player 10 can click the PCs 221, 223, and 225, drag them to one cell of the plurality of cells 210, and arrange each of the PCs 221, 223, and 225 in the cell (S1, S2, and S3). Alternatively, the PvE player 10 can click the PCs 221, 223, and 225, click one cell of the plurality of cells 210, and arrange the PCs 221, 223, and 225 therein (S1, S2, and S3).

When the arrangement of the PCs is completed, the PvE game providing unit 120 can secondly request the PvE player to set an order in which actions possessed by the arranged PCs are executed.

In response to this request, the PvE player 10 can click the arranged PCs and set the order in which the actions possessed by the arranged PCs are executed.

The arrangement of the PCs and the setting of the order in which actions possessed by the PCs are executed are examples, and the PCs may be arranged in consideration of all actions of a user corresponding to the input device.

When the setting of the order of the PCs is completed as described above, the PvE game providing unit 120 can provide a PvE game for combat with one or more NPCs of a plurality of NPCs to the PvE player 10.

That is, when a PvE player 10 arranges the PCs 221, 223, and 225 and sets the order in which the actions of the arranged PCs are executed, the PvE game providing unit 120 can provide a PvE game for combating with an NPC by executing the possessed actions at the arranged positions in accordance with the order in which the arranged PCs are set to the PvE player 10. On other words, the PvE game which is provided from the PvE game providing unit 120 requires input information in arranging the PCs and setting the order, and thereafter can automatically execute combats.

A PvE game will be described below in more detail. Physical strength values of PCs can be decreased due to an attack from an NPC, and physical strength value set for the NPC can also be decreased due to an attack from a PC. Here, when a physical strength value becomes zero, characters can be set to execute no action. When a physical strength value becomes zero, an image of the corresponding PC may disappear or may be changed to an image corresponding to death. When physical strength values of all PCs become zero, it means that the PvE player loses the combat with the NPC. On the other hand, when a physical strength value of at least one PC of all the arranged PCs is not zero and the physical strength value of the NPC becomes zero, it means that the PvE player wins the combat with the NPC.

The PCs can include a range-attack PC that immediately attacks an NPC arranged in a first attack range, a range-aid PC that immediately aids a PC arranged in a first aid range, a magic range-attack PC that attacks an NPC arranged in a second attack range after a first time elapses, a magic range-aid PC that aids a PC arranged in a second aid range after a second time elapses, and a range-protection PC that immediately protects a PC arranged in a protection range from attack by the NPC. The first time and the second time may be set to a time until the corresponding PC has a next action priority.

For example, the first attack range and the second attack range can be set to two or more cells in the horizontal direction, two or more cells in the vertical direction, two or more cells in the diagonal direction, or two or more cells in the horizontal direction and in the vertical direction from the cell in which an NPC is arranged (in total 18 cells including three cells in the vertical direction and six cells in the horizontal direction similarly to 210), and can be applied differently for each attack PC and each magic attack PC. Here, the first attack range and the second attack range may be two or more cells which are adjacent to each other or two or more cells which are not adjacent to each other.

The first aid range, the second aid range, and the protection range can be set to two or more cells in the horizontal direction, two or more cells in the vertical direction, two or more cells in the diagonal direction, or two or more cells in the horizontal direction and in the vertical direction from the cell 210 in which the PvE player 10 arranges a PC, and can be applied differently for each aid PC, each magic aid PC, and each aid PC. Here, the first aid range, the second aid range, and the protection range may be two or more cells which are adjacent to each other or two or more cells which are not adjacent to each other.

Alternatively, the PCs can include a single-attack PC that immediately attacks an NPC arranged in one cell based on a first attack rule, a single-aid PC that immediately aids a PC arranged in one cell based on a first aid rule, a magic single-attack PC that attacks an NPC arranged in one cell based on a second attach rule after a first time elapses, and a magic single-aid PC that aids a PC arranged on one cell based on a second aid rule after a second time elapses. The first time and the second time may be set to a time until the corresponding PC has a next action priority.

For example, the first attack rule and the second attack rule can be set in combination of a first condition in which the characters are on the same line in the cell in which the NPC is arranged and a second condition in which the characters are adjacent to each other. When only one condition of the first condition and the second condition is satisfied, the first attack rule and the second attack rule can be set by preferentially considering the first condition. For example, when there are a first NPC satisfying the first condition and being located distant and a second NPC not satisfying the first condition and being located close, the first attack rule and the second attack rule can be set to attack the first NPC.

On the other hand, all the PCs can execute preset actions in executing actions possessed thereby. For example, an attack PC 221 carrying a sword and a shield can be set to an action of approaching an NPC arranged in a preset range or cell and attacking the NPC by swinging the sword, an attack PC 223 carrying a bow can be set to an action of shooting an arrow at an NPC arranged in a preset range or cell. An aid PC or protection PC 225 carrying a stick can be set to an action of gradually generating a first aura and an action of gradually generating a second aura for a PC arranged in a preset range or cell.

On the other hand, aiding which is an action of an aid PC can be set to one or more of immediately executing an action of the corresponding PC, moving the corresponding PC to a moving range or a destination cell which is input in advance, recovering the physical strength value of the corresponding PC by a predetermined value, increasing an attack power of the corresponding PC, and decreasing a damage applied to the corresponding PC. Here, the PC which has been moved by the aid PC can be rearranged in the cell before the movement after a preset moving period elapses. The aid PC that execute such an action can provide various variables to enhance a user's interest.

On the other hand, when all the PCs of a preset group are arranged, the PvE game providing unit 120 can enhance effects of the actions possessed by the PCs of the group. For example, an attack power or an attack range of an attack PC can be enhanced. An aid time, an aid influence (for example, an amount of physical strength value recovered), or an aid range of an aid PC can be enhanced. On the other hand, a protection time or a protection range of a protection PC can be enhanced.

When all the PCs of a preset group are arranged, the PvE game providing unit 120 can simultaneously execute the actions possessed by the PCs of the group. The simultaneous execution can mean that the actions are executed at a time or that are executed sequentially without turnover to the NPC. Here, a condition can be set in simultaneously executing the actions possessed by the PCs of the group. For example, the condition may be a condition in which the counted number of successes is equal to a predetermined threshold number when the number of successes of a predetermined action of the actions set for the PCs of the group is counted.

When input information corresponding to the PvP game is received, the PvP game providing unit 130 of the combat game providing device 100 according to the embodiment can request a PvP player 10 to arrange one PC out of the plurality of PCs in each of the plurality of cells in accordance with the order which is determined by the predetermined rule and provide a PvP game for combat by executing actions possessed by the arranged PCs in accordance with the order in which the PCs are arranged to the PvP player 10.

This will be described below in more detail with reference to FIG. 3 which is a diagram illustrating the configuration of the PvP game providing unit according to the combat game providing device according to the embodiment and FIG. 4 which is a diagram illustrating an example for describing the operation of the PvP game providing unit of the combat game providing device 100 according to the embodiment.

Figure 3:
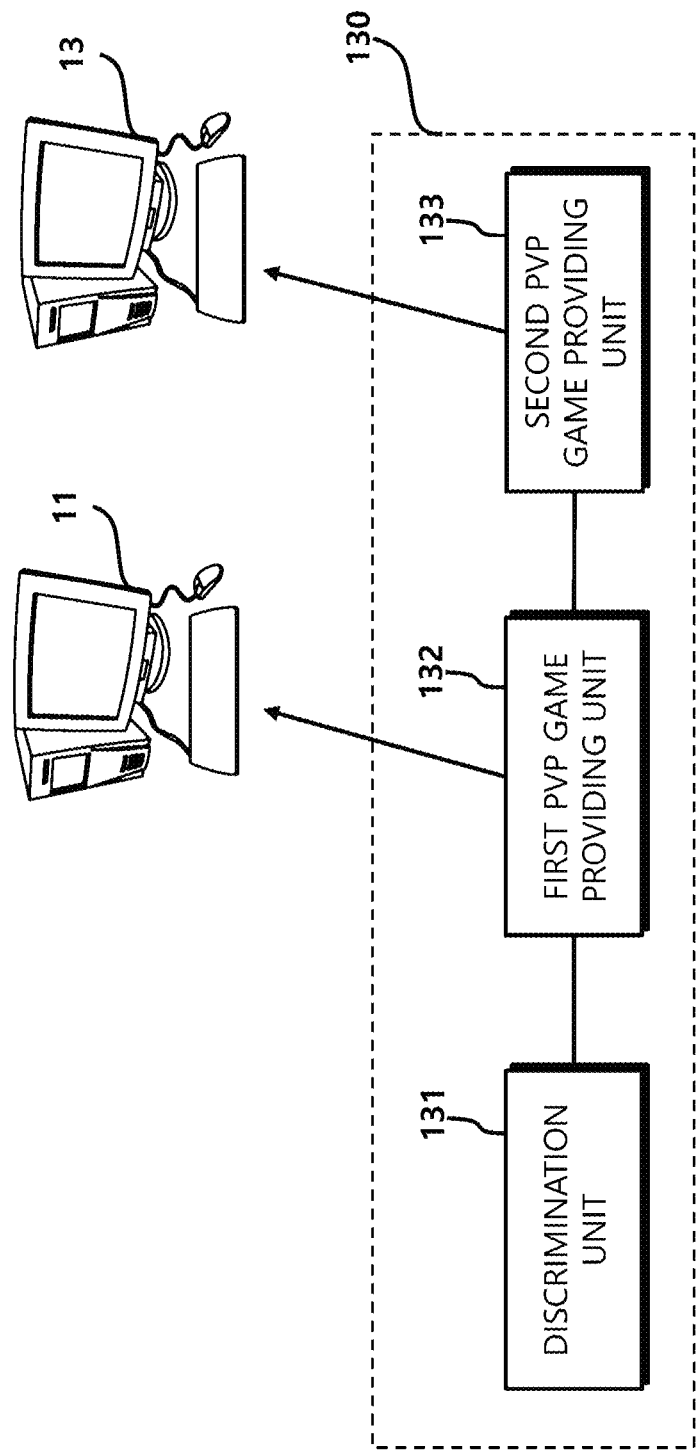
FIG. 3 is a diagram illustrating a configuration of a PvP game providing unit of the combat game providing device according to the embodiment.

Referring to FIG. 3, the PvP game providing unit 130 can include a discrimination unit 131 that discriminates a first PvP player 11 having a high priority and a second PvP player 13 having a low priority in accordance with the rule, a first PvP game providing unit 132 that requests the first PvP player 11 to arrange one PC out of the plurality of PCs in each of a plurality of first cells in accordance with a first order and provides the PvP game for combating with a PC arranged by the second PvP player 13 by executing actions possessed by the arranged PCs in accordance with the arranged order to the first PvP player 11, and a second PvP game providing unit 133 that requests the second PvP player 13 to arrange one PC out of the plurality of PCs in each of a plurality of second cells in accordance with a second order and provides the PvP game for combating with a PC arranged by the first PvP player 11 by executing actions possessed by the arranged PCs in accordance with the arranged order to the second PvP player 13. The first order may be an order (an order of odd numbers) of 1, 3, 5, . . . , 2K−1 where K is a predetermined natural number and the second order may be an order (an order of even numbers) of 2, 4, 6, . . . , 2K. The natural number K represents the number of PCs which will be arranged by a PvP player and can be set on the basis of input information received from the player.

The first PvP player 11 and the second PvP player 13 may be players of which the priorities are discriminated by the discrimination unit 131 out of the PvP players 10 that have transmitted input information corresponding to the PvE.

The discrimination unit 131 requests a PvP player 10 to select one input out of a plurality of inputs and can discriminate the first PvP player and the second PvP player in accordance with the rule for the selected input.

For example, the discrimination unit 131 can request each PvP player 10 to select one of rock, paper, and scissors and can discriminate the first PvP player 11 and the second PvP player 13 in accordance with the rule for the result of selection. Specifically, there may be a case in which the first PvP player 11 selects rock and the second PvP player 13 selects scissors, a case in which the first PvP player 11 selects scissors and the second PvP player 13 selects paper, and a case in which the first PvP player 11 selects paper and the second PvP player 13 selects rock. When the PvP players completely has selected rock, paper, or scissors, the discrimination unit 131 can open the results of selection to the PvP players.

For example, the discrimination unit 131 can request the PvP players 10 to select a plurality of inputs in the order of application and discriminate the first PvP player 11 and the second PvP player 13 in accordance with the rule for the results of selection. The plurality of inputs cannot be seen before being selected and the results of selection can be open to the PvP players after being selected. When the plurality of inputs are numerals, the first PvP player 11 may select a numeral having a higher priority (the priority rule may be open to all the players before the selection) than that of the second PvP player 13.

Alternatively, the discrimination unit 131 can distinguish the first PvP player 11 and the second PvP player 13 in accordance with the rule for records or items corresponding to the PvP players 10.

For example, the discrimination unit 131 can discriminate a PvP player 10 having a low record value as a second PvP player 11 and discriminate a PvP player having a higher record value as a first PvP player 13. The levels of the record values are relative, and an advantage can be provided to a PvP player 10 having a low record value to make combats interesting by discriminating a PvP player 10 having a low record as a second PvP player 13. The record value can increase as the number of wins in recent combats increases or as the sum of capability values for actions of a PC increases.

For example, the discrimination unit 131 can discriminate a PvP player 10 possessing a priority item as a second PvP player 11 and discriminate a PvP player not possessing a priority item as a first PvP player 13.

For example, the discrimination unit 131 can discriminate between the second PvP player 11 and the first PvP player 13 depending on whether a priority item is possessed. The discrimination unit 131 can discriminate a PvP player 10 a low record value as a second PvP player 13 and a PvP player 10 having a high record value as a first PvP player 11 in consideration of the record values when both PvP players possess a priority item or none thereof possess a priority item.

Figure 4:
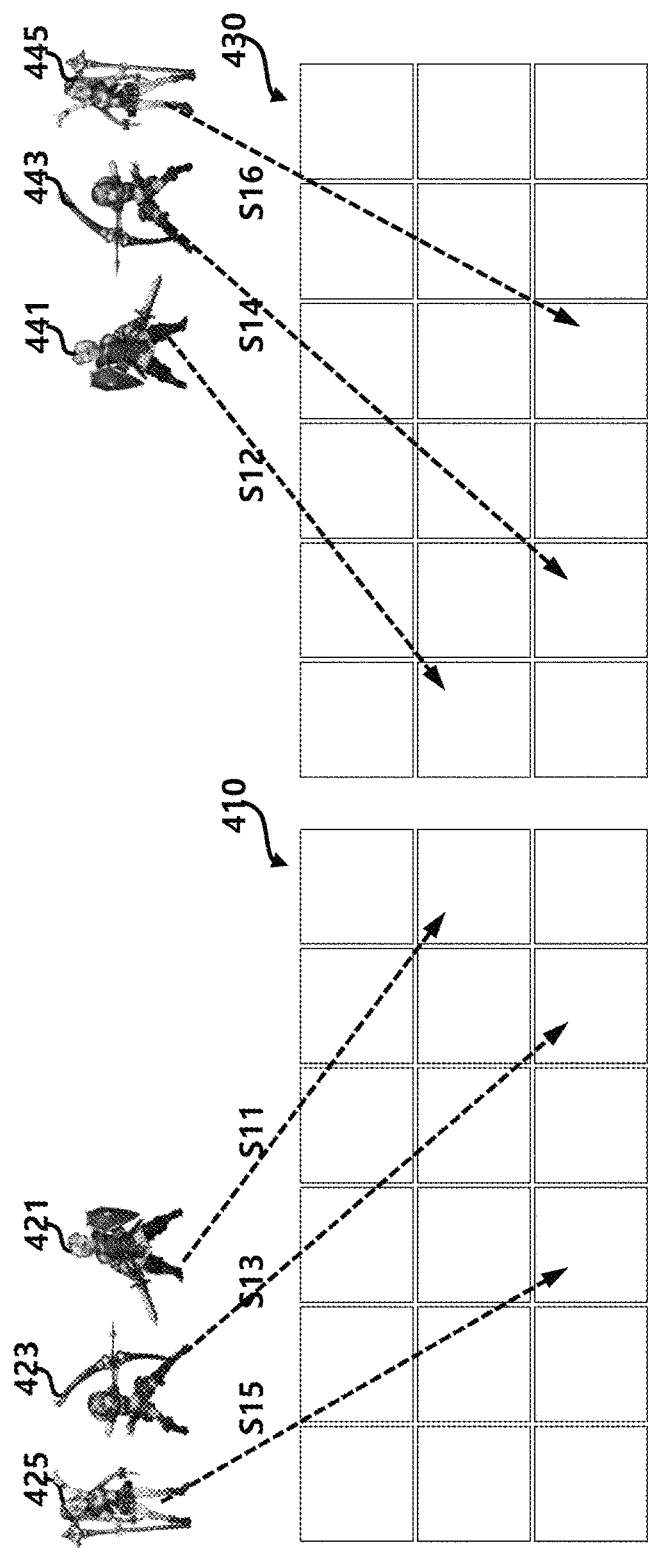
FIG. 4 is a diagram illustrating an example for describing an operation of the PvV game providing unit of the combat game providing device according to the embodiment.

Further referring to FIG. 4, the first PvP game providing unit 132 can request the first PvP player 11 to arrange one PC out of a plurality of PCs 421, 423, and 425 in each of a plurality of first cells 410 in accordance with a first order (S11, S13, and S15) and provide the PvP game for combating with a PC arranged by the second PvP player 13 by executing actions possessed by the arranged PCs in accordance with the arranged order (S11, S13, and S15) to the first PvP player 11.

The second PvP game providing unit 133 can request the second PvP player 13 to arrange one PC out of a plurality of PCs 441, 443, and 445 in each of a plurality of first cells 430 in accordance with a second order (S12, S14, and S16) and provide the PvP game for combating with a PC arranged by the first PvP player 12 by executing actions possessed by the arranged PCs in accordance with the arranged order (S12, S14, and S16) to the second PvP player 13.

In other words, the PC 421 possessed by the first PvP player 11 can be arranged in the plurality of cells 410 (S11), the PC 441 possessed by the second PvP player 13 can be arranged in the plurality of cells 430 (S12), the PC 423 possessed by the first PvP player 11 can be arranged in the plurality of cells 410 (S13), the PC 443 possessed by the second PvP player 13 can be arranged in the plurality of cells 430 (S14), the PC 425 possessed by the first PvP player 11 can be arranged in the plurality of cells 410 (S15), and the PC 445 possessed by the second PvP player 13 can be arranged in the plurality of cells 430 (S16). That is, the first PvP player 11 and the second PvP player 13 can alternately arrange the PCs possessed thereby in the plurality of cells 410 and 430 allocated thereto. In FIG. 4, three PCs are illustrated as the plurality of PCs, and more various PCs may be provided.

FIG. 4 illustrates only an example. The first PvP player 11 and the second PvP player 13 can strategically arrange the PCs in comprehensive consideration of actions of the PCs possessed thereby, actions of the PCs arranged by the opposite player, and the like. That is, even when the first PvP player 11 and the second PvP player 13 arrange the same PC, the game result can vary depending on in what order the PC is arranged and thus it is possible to make the PvP players 11 and 13 interested in the game.

A PvP game will be described below in more detail. Physical strength values set for PCs can be decreased due to an attack from a PC arranged by the opposite PvP player. When a physical strength value becomes zero, the corresponding PC can be set to execute no action. Here, when a physical strength value becomes zero, an image of the corresponding PC may disappear or may be changed to an image corresponding to death. When physical strength values of all the arranged PCs become zero, it means that the PvP player loses the combat with the PC. On the other hand, when a physical strength value of at least one PC of all the arranged PCs is not zero and the physical strength value of the PC arranged by the opposite PvP player becomes zero, it means that the PvV player wins the combat with the opposite PvP player.

Here, the PCs can include a range-attack PC that immediately attacks a PC of the opposite PvP player (which means a player combating with the present PvP player, which is the same in the following description) arranged in a first attack range, a range-aid PC that immediately aids a PC of the present PvP player (which means a player combating with the opposite PvP player, which is the same in the following description) arranged in a first aid range, a magic range-attack PC that attacks a PC of the opposite PvP player arranged in a second attack range after a first time elapses, a magic range-aid PC that aids a PC of the present PvP player arranged in a second aid range after a second time elapses, and a range-protection PC that immediately protects a PC of the present PvP player arranged in a protection range from attack by the PC of the opposite PvP player. The first time and the second time may be set to a time until the corresponding PC has a next action priority.

For example, the first attack range and the second attack range can be set to two or more cells in the horizontal direction, two or more cells in the vertical direction, two or more cells in the diagonal direction, or two or more cells in the horizontal direction and in the vertical direction from the cell 430 in which a PC of the opposite PvP player is arranged, and can be applied differently for each attack PC and each magic attack PC. Here, the first attack range and the second attack range may be two or more cells which are adjacent to each other or two or more cells which are not adjacent to each other.

The first aid range, the second aid range, and the protection range can be set to two or more cells in the horizontal direction, two or more cells in the vertical direction, two or more cells in the diagonal direction, or two or more cells in the horizontal direction and in the vertical direction from the cell 410 in which the present PvP player arranges a PC, and can be applied differently for each aid PC, each magic aid PC, and each aid PC. Here, the first aid range, the second aid range, and the protection range may be two or more cells which are adjacent to each other or two or more cells which are not adjacent to each other.

On the other hand, the PCs can include a single-attack PC that immediately attacks a PC arranged by the opposite PvP player in one cell based on a first attack rule, a single-aid PC that immediately aids a PC arranged in one cell based on a first aid rule by the opposite PvP player, a magic single-attack PC that attacks a PC arranged in one cell based on a second attach rule by the opposite PvP player after a first time elapses, and a magic single-aid PC that aids a PC arranged in one cell based on a second aid rule by the opposite PvP player after a second time elapses. The first time and the second time may be set to a time until the corresponding PC has a next action priority.

For example, the first attack rule and the second attack rule can be set in combination of a first condition in which the characters are on the same line in the cell in which a PC is arranged by the opposite PvP player and a second condition in which the characters are adjacent to each other. When there are a first PC satisfying the first condition and being located distant (arranged by the opposite PvP player) and a second PC not satisfying the first condition and being located close (arranged by the opposite PvP player), the first attack rule and the second attack rule can be set to attack the first PC.

On the other hand, all the PCs can execute preset actions in executing actions possessed thereby. For example, an attack PC 421 or 441 carrying a sword and a shield can be set to an action of approaching a PC arranged by the opposite PvP player and attacking the PC by swinging the sword, an attack PC 423 or 443 carrying a bow can be set to an action of shooting an arrow at a PC arranged by the opposite PvP player. An aid PC or protection PC 425 or 445 carrying a stick can be set to an action of gradually generating a first aura and an action of gradually generating a second aura for a PC arranged by the present PvP player.

On the other hand, aiding which is an action of an aid PC can be set to one or more of immediately executing an action of the corresponding PC, moving the corresponding PC to a moving range or a destination cell which is input in advance, recovering the physical strength value of the corresponding PC by a predetermined value, increasing an attack power of the corresponding PC by a predetermined amount, and decreasing a damage applied to the corresponding PC. Here, the PC which has been moved by the aid PC can be rearranged in the cell before the movement after a preset moving period elapses. The aid PC that executes such an action can provide various variables to enhance a user's interest.

On the other hand, when all the PCs of a preset group are arranged, the PvP game providing unit 130 can enhance effects of the actions possessed by the PCs of the group. For example, an attack power or an attack range of an attack PC can be enhanced. An aid time, an aided influence (for example, an amount of physical strength value recovered), or an aid range of an aid PC can be enhanced. A protection time or a protection range of a protection PC can be enhanced.

When all the PCs of a preset group are arranged, the PvP game providing unit 130 can simultaneously execute the actions possessed by the PCs of the group. The simultaneous execution can mean that the actions are executed at a time or that are executed sequentially without turnover to the opposite PvP player. Here, a condition can be set in simultaneously executing the actions possessed by the PCs of the group. For example, the condition may be a condition in which the counted number of successes is equal to a predetermined threshold number when the number of successes of a predetermined action of the actions set for the PCs of the group is counted.

The combat game providing device 100 according to the embodiment described above can provide a PvE game or a PvP game including various variables to players 10. That is, the combat game providing device 100 can make a user more interested in the game.

A combat game providing method which is an operation performed by the combat game providing device which has been described above with reference to FIGS. 1 to 4 will be described below in brief.

Figure 5:
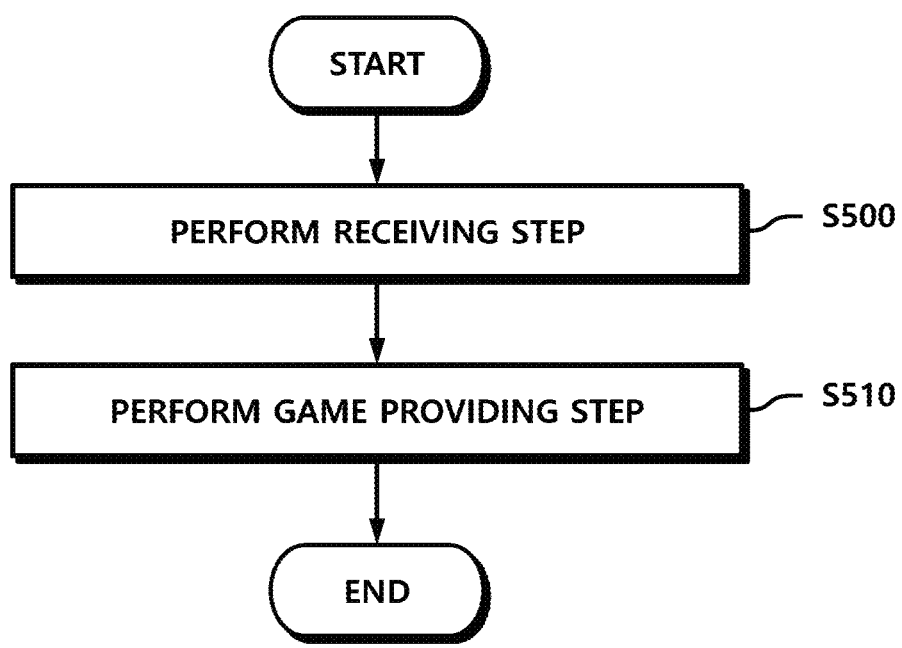
FIG. 5 is a diagram illustrating a flow of a combat game providing method according to the embodiment.

FIG. 5 is a diagram illustrating a flow of the combat game providing method according to the embodiment.

Referring to FIG. 5, the combat game providing method according to the embodiment includes a receiving step S500 of receiving input information from a player and a game providing step S510 of firstly requesting a PvE player to arrange one or more player characters (hereinafter abbreviated to PCs) out of a plurality of PCs possessing predetermined actions in a plurality of cells, secondly requesting the PvE player to set an order in which actions possessed by the arranged PCs are executed, and providing a PvE game for combat with one or more non-player characters (hereinafter abbreviated to NPCs) to the PvE player when input information corresponding to the PvE game is received, and requesting a PvP player to arrange one PC out of the plurality of PCs in each of the plurality of cells in accordance with an order which is determined by a predetermined rule and providing a PvP game for combat by executing actions possessed by the arranged PCs in accordance with the order in which the PCs are arranged to the PvP player when input information corresponding to the PvP game is received.

The game providing step S510 can selectively provide at least one of a PvE game and a PvP game, which can be determined by input information which is received.

This will be described below in detail with reference to FIG. 6 which is a diagram illustrating an example for describing the combat game providing method according to the embodiment.

Referring to FIG. 6, in the receiving step S500 of the combat game providing method according to the embodiment, input information which is provided from a player can be received (S600). The input information can include information which is generated to select a PvE game for combat with an NPC in response to a certain action (which may be, for example, actions of clicking, dragging, or flicking a mouse) of a user corresponding to an input device, information which is generated to select a PvP game for combat with a PC, information which is generated to arrange PCs possessing predetermined actions in a plurality of cells, and information which is generated to set an order for executing actions possessed by PCs.

In the game providing step S510 of the combat game providing method according to the embodiment, it can be determined whether input information corresponding to a PvE game is received (S610).

When it is determined in Step S610 that input information corresponding to a PvE game is received (YES), the game providing step S510 can include firstly requesting a PvE player to arrange one or more PCs out of a plurality of PCs possessing predetermined actions in a plurality of cells (S620), secondly requesting the PvE player to set an order in which actions possessed by the arranged PCs are executed (630), and providing a PvE game for combat with one or more non-player characters to the PvE player 10 (S640).

According to this configuration, when a PvE player arranges PCs and sets the order in which the actions of the arranged PCs are executed, the game providing step S510 can include providing a PvE game for combating with an NPC to the PvE player by executing the possessed actions at the arranged position in the order in which the arranged PCs are set. In other words, the PvE game which is provided in the game providing step S510 requires input information in arranging the PCs and setting the order, and thereafter can automatically execute combats.

On the other hand, when it is determined in Step S610 that input information corresponding to the PvE game is not received (NO), the game providing step S510 can include determining whether input information corresponding to a PvP game (S650).

When it is determined in Step S650 that input information corresponding to the PvP game is received (YES), the game providing step can include requesting a PvP player to arrange one PC out of the plurality of PCs in each of the plurality of cells in accordance with the order which is determined by the predetermined rule (S660) and providing a PvP game for combat by executing actions possessed by the arranged PCs in accordance with the order in which the PCs are arranged to the PvP player (S670).

According to this configuration, a first PvP player and a second PvP player can strategically arrange the PCs in comprehensive consideration of actions of the PCs possessed thereby, actions of the PCs arranged by the opposite player, and the like. That is, even when the first PvP player and the second PvP player arrange the same PC, the game result can vary depending on in what order the PC is arranged and thus it is possible to make the PvP players interested in the game.

A PvE game which is provided in Step S640 and a PvP game which is provided in Step S670 will be described below in more detail. Physical strength values set for PCs can be decreased due to an attack from an NPC or a PC arranged by the opposite PvP player. When a physical strength value becomes zero, the corresponding PC can be set to execute no action. Here, when a physical strength value becomes zero, an image of the corresponding PC may disappear or may be changed to an image corresponding to death.

On the other hand, when all the PCs of a preset group are arranged in providing a PvE game or a PvP game in the game providing step S510, effects of the actions possessed by the PCs of the group can be enhanced. For example, an attack power or an attack range of an attack PC can be enhanced. An aid time, an aided influence (for example, an amount of physical strength value recovered), or an aid range of an aid PC can be enhanced. A protection time or a protection range of a protection PC can be enhanced.

When all the PCs of a preset group are arranged in providing a PvE game or a PvP game in the game providing step S510, the actions possessed by the PCs of the group can be simultaneously executed. The simultaneous execution can mean that the actions are executed at a time or that are executed sequentially without turnover to an NPC or a PC arranged by the opposite PvP player. Here, a condition can be set in simultaneously executing the actions possessed by the PCs of the group. For example, the condition may be a condition in which the counted number of successes is equal to a predetermined threshold number when the number of successes of a predetermined action of the actions set for the PCs of the group is counted.

In addition, the combat game providing method can include the operations which are performed by the combat game providing device described above with reference to FIGS. 1 to 4.

The above description and the accompanying drawings provide an example of the technical idea of the present invention for illustrative purposes only. Those skilled in the art will appreciate that various modifications and changes such as combinations, separations, substitutions, and changes of configurations are possible without departing from the essential features of the present invention. Therefore, the embodiments disclosed herein are intended to illustrate, not define, the technical idea of the present invention, and the scope of the present invention is not limited to the embodiments. The scope of the present invention shall be construed on the basis of the appended claims in such a manner that all the technical ideas within the range equivalent to the claims belong to the scope of the present invention.

FIG. 7 is a block diagram illustrating a combat game providing device 100 according to another embodiment of the invention.

The above-mentioned embodiments of the invention can be embodied, for example, as a computer-readable recording medium in a computer system. As illustrated in FIG. 7, a computer system 700 of a combat game providing device 100 can include at least one of one or more processors 710, a memory 720, a storage unit 730, a user-interface input unit 740, and a user-interface output unit 750, which can communication with each other via a bus 760. The computer system 700 may further include a network interface 770 for access to a network. The processor 710 may be a CPU or a semiconductor device that executes processing command words which are stored in the memory 720 and/or the storage unit 730. The memory 720 and the storage unit 730 can include various types of volatile/nonvolatile storage mediums. For example, the memory can include a ROM 724 and a RAM 725.

Accordingly, the embodiments of the invention can be embodied as a method which is implemented by a computer or a nonvolatile computer recording medium in which computer-executable command words are stored. When the command words are executed by a processor, at least a method according to an embodiment of the invention can be performed.

The system and the method according to the embodiments of the invention can be embodied in the form of program commands which can be executed by various computer systems and can be recorded in a computer-readable medium. A computer-readable medium can include program commands, data files, data structures, and the like alone or in combination.

Program commands which are recorded in a computer-readable medium may be particularly designed and constructed for the invention or may be known to and used by those skilled in the field of computer software. Examples of a computer-readable recording medium include a magnetic medium such as a hard disk, a floppy disk, and a magnetic tape, an optical medium such as a CD-ROM or a DVD, a magneto-optical medium such as a floptical disk, and a hardware device which is particularly constructed to store and execute program commands, such as a ROM, RAM, or a flash memory. Such a medium may be a transmission medium such as an optical fiber, a metal wire, or a waveguide including carrier waves for transmitting a signal for designating program commands or data structures. Examples of program commands include machine language codes generated by a compiler and high-level language codes which can be executed by a computer using an interpreter or the like.

The above-mentioned hardware device can be configured to operate as one or more software modules for performing the operations according to the invention, and vice versa.

Embodiments of the invention have been described above. Those skilled in the art will appreciate that various modifications and changes such as combinations, separations, substitutions, and changes of configurations are possible without departing from the essential features of the present invention. Therefore, the embodiments disclosed herein are intended to illustrate, not define, the technical idea of the present invention, and the scope of the present invention is not limited to the embodiments. The scope of the present invention shall be construed on the basis of the appended claims in such a manner that all the technical ideas within the range equivalent to the claims belong to the scope of the present invention.

Industrial Applicability

The invention relates to a combat game providing technique and more particularly to a combat game providing device and a combat game providing method that provide a game having various game methods depending on players. The invention can provide a combat game providing device and a combat game providing method that can keep an interest in a game by providing various variables for combats.

The invention claimed is:

1. A combat game providing device comprising:
a receiving unit configured to receive input information from a player; and
a game providing unit that includes at least one of a player vs Environment (hereinafter abbreviated to PvE) game providing unit and a player vs player (hereinafter abbreviated to PvP) game providing unit, wherein:
the PvE game providing unit is configured to:
firstly request a PvE player to arrange one or more player characters (hereinafter abbreviated to PCs) out of a plurality of PCs possessing predetermined actions in a plurality of cells;
secondly request the PvE player to set an order in which actions possessed by the arranged PCs are executed; and to provide a PvE game for combat with one or more non-player characters (hereinafter abbreviated to NPCs) to the PvE player when input information corresponding to the PvE game is received; and the PvP game providing unit is configured to:
request a PvP player to arrange one PC out of the plurality of PCs in each of the plurality of cells in accordance with an order which is determined by a predetermined rule; and
to provide a PvP game for combat by executing actions possessed by the arranged PCs in accordance with the order in which the PCs are arranged to the PvP player when input information corresponding to the PvP game is received;

wherein the PVP game providing unit includes:
a discrimination unit configured to discriminate a first PvP player having a high priority and a second PvP player having a low priority in accordance with the rule;
a first PvP game providing unit configured to request the first PvP player to arrange one PC out of the plurality of PCs in each of a plurality of first cells in accordance with a first order and to provide the PvP game for combating with a PC arranged by the second PvP player by executing actions possessed by the arranged PCs in accordance with the arranged order to the first PvP player; and
a second PvP game providing unit configured to request the second PvP player to arrange one PC out of the plurality of PCs in each of a plurality of second cells in accordance with a second order and to provide the PvP same for combating with a PC arranged by the first PvP player by executing actions possessed by the arranged PCs in accordance with the arranged order to the second PvP player, and
wherein the first order is an order of 1, 3, 5, . . . , 2K−1 where K is a predetermined natural number and the second order is an order of 2, 4, 6, . . . , 2K.

2. The combat game providing device according to claim 1, wherein the discrimination unit is configured to request the PvP players to select one input of a plurality of inputs and to discriminate the first PvP player and the second PvP player in accordance with the rule for the selected input.

3. The combat game providing device according to claim 1, wherein the discrimination unit is configured to discriminate the first PvP player and the second PvP player in accordance with the rule for records or items corresponding to the PvP players.

4. The combat game providing device according to claim 1, wherein the plurality of PCs include a range-attack PC that immediately attacks an NPC or a PC arranged in a first attack range, a range-aid PC that immediately aids a PC arranged in a first aid range, a magic range-attack PC that attacks an NPC or a PC arranged in a second attack range after a first time elapses, a magic range-aid PC that aids a PC arranged in a second aid range after a second time elapses, and a range-protection PC that immediately protects a PC arranged in a protection range from attack by the NPC or the PC.

5. The combat game providing device according to claim 1, wherein the plurality of PCs include a single-attack PC that immediately attacks an NPC or a PC arranged in one cell based on a first attack rule, a single-aid PC that immediately aids a PC arranged in one cell based on a first aid rule, a magic single-attack PC that attacks an NPC or a PC arranged in one cell based on a second attach rule after a first time elapses, and a magic single-aid PC that aids a PC arranged on one cell based on a second aid rule after a second time elapses.

6. The combat game providing device according to claim 1, wherein the at least one of the first attack rule and the second attack rule is set on the basis of at least one of a first condition that characters are on the same line in the cell and a second condition that characters are adjacent in the cell.

7. The combat game providing device according to claim 1, wherein the plurality of PCs include an aid PC that aids a PC arranged in one cell based on a predetermined aid range or a predetermined air rule to immediately execute an action.

8. The combat game providing device according to claim 1, wherein the plurality of PCs include an aid PC that aids a PC arranged in a first aid range or an aid cell which is input from the player to move to a moving range or a destination cell which is input in advance by the player.

9. The combat game providing device according to claim 8, wherein the aid PC aids a PC that has moved to the moving range or the destination cell.

10. The combat game providing device according to claim 1, wherein the PvE game providing unit or the PvP game providing unit enhances effects of actions possessed by PCs of a predetermined group when all the PCs of the group are arranged.

11. The combat game providing device according to claim 1, wherein the PvE game providing unit or the PvP game providing unit simultaneously executes actions possessed by PCs of a predetermined group when all the PCs of the group are arranged.

12. The combat game providing device according to claim 1, wherein the PvE game providing unit or the PvP game providing unit counts the number of successes for a predetermined action out of actions set for PCs of a predetermined group and simultaneously executes the actions possessed by the PCs of the group when the number of successes reaches a predetermined threshold number.

13. A combat game providing device comprising
a receiving unit configured to receive input information from a player; and
a game providing unit that includes at least one of a player vs Environment (hereinafter abbreviated to PvE) game providing unit configured to firstly request a PvE player to arrange one or more player characters (hereinafter abbreviated to PCs) out of a plurality of PCs possessing predetermined actions in a plurality of cells, to secondly request the PvE player to set an order in which actions possessed by the arranged PCs are executed, and to provide a PvE game for combat with one or more non-player characters (hereinafter abbreviated to NPCs) to the PvE player vs player input information corresponding to the PvE game is received and a player vs player (hereinafter abbreviated to PvP) game providing unit configured to request a PvP player to arrange one PC out of the plurality of PCs in each of the plurality of cells in accordance with an order which is determined by a redetermined rule and to provide a PvP game for combat by executing actions possessed by the arranged PCs in accordance with the order in which the PCs are arranged to the PvP player when input information corresponding to the PvP game is received,
wherein the plurality of PCs include an aid PC that aids a PC arranged in a first aid range or an aid cell which is input from the player to move to a moving range or a destination cell which is input in advance by the player, wherein the PC that is aided by the aid PC is arranged in the moving range or the destination cell and is rearranged in the first aid range or the aid cell after a predetermined moving period elapses.

14. A combat game providing device comprising:
a receiving unit configured to receive input information from a player; and
a game providing unit that includes at least one of a player vs Environment (hereinafter abbreviated to PvE) game providing unit configured to firstly request a PvE player to arrange one or more player characters (hereinafter abbreviated to PCs) out of a plurality of PCs possessing predetermined actions in a plurality of cells, to secondly request the PvE player to set an order in which actions possessed by the arranged PCs are executed, and to provide a PvE game for combat with one or more non-player characters (hereinafter abbreviated to NPCs) to the PvE player when input information corresponding to the PvE game is received and a player vs player (hereinafter abbreviated to PvP) game providing unit configured to request a PvP player to arrange one PC out of the plurality of PCs in each of the plurality of cells in accordance with an order which is determined by a predetermined rule and to provide a PvP game for combat by executing actions possessed by the arranged PCs in accordance with the order in which the PCs are arranged to the PvP player when input information corresponding to the PvP game is received,
wherein the predetermined rule is at least one of input information which is received from the PvP player in real time and input information which has been received in advance.

* * * * *